(12) United States Patent
Turner et al.

(10) Patent No.: US 6,571,180 B1
(45) Date of Patent: May 27, 2003

(54) SELF-CONTAINED STEAM TRAP MONITOR

(75) Inventors: John M. Turner, Aztec, NM (US); Jan L. Nethers, Farmington, NM (US)

(73) Assignee: Keystone International Holding Corp., Houston, TX (US)

( * ) Notice: Subject to any disclaimer, the term of this patent is extended or adjusted under 35 U.S.C. 154(b) by 885 days.

(21) Appl. No.: 08/840,200

(22) Filed: Apr. 11, 1997

(51) Int. Cl.$^7$ ............................................. G06F 17/00
(52) U.S. Cl. .................... 702/45; 702/182; 702/183; 73/168
(58) Field of Search ...................... 702/45, 33–35, 702/39, 48, 51, 54, 24, 56, 71, 79, 81–84, 89, 103, 105, 113, 115, 176–179, 182–185, 187; 364/143, 152, 153, 183, 184, 528.1, 528.15, 528.17, 528.24, 528.31, 528.41; 73/40.5 A, 168, 587, 40, 40.5 R, 597, 602, 392; 137/554, 552.7, 551, 171, 183; 236/52; 340/606, 605; 706/904, 906, 907, 912, 914, 915

(56) References Cited

U.S. PATENT DOCUMENTS

| | | | |
|---|---|---|---|
| 4,288,032 A | * | 9/1981 | Hetz ........................... 137/183 |
| 4,788,849 A | * | 12/1988 | Yonemura et al. ....... 73/40.5 A |
| 4,898,022 A | | 2/1990 | Yumoto et al. ................ 73/46 |
| 4,945,343 A | | 7/1990 | Rodriguez ................... 340/606 |
| 5,154,080 A | | 10/1992 | Hill et al. ..................... 73/597 |
| 5,206,818 A | | 4/1993 | Speranza .................... 702/24 |
| 5,239,874 A | * | 8/1993 | Hale ........................ 73/168 |
| 5,329,465 A | * | 7/1994 | Arcella et al. ............. 137/554 |
| 5,425,270 A | * | 6/1995 | McDonald et al. .......... 73/168 |
| 5,535,136 A | | 7/1996 | Standifer ..................... 702/51 |
| 5,616,824 A | * | 4/1997 | Abdel-Malek et al. ........ 73/168 |

* cited by examiner

Primary Examiner—Hal Wachsman
(74) Attorney, Agent, or Firm—Carlos A. Torres; Browning Bushman, P.C.

(57) ABSTRACT

A self-contained system to continuously monitor a mechanism used to process, control or regulate fluid flow or pressure and provide a continuing indication of the status or condition of the monitored mechanism. A specific form of the invention employs a low frequency sonic-to-electrical transducer that monitors opening and closing of a disk-type steam trap. The detected sonic signal is processed and sent to a microprocessor that is programmed to develop a time-based, baseline data set representative of normal operation of the steam trap in the environment in which it operates. The baseline data set is compared with the data from on-line operations of the steam trap. As the environment and the steam trap operation change during normal on-line operations, the baseline data set is updated to change with the changing environment and the changing steam trap operation.

18 Claims, 2 Drawing Sheets

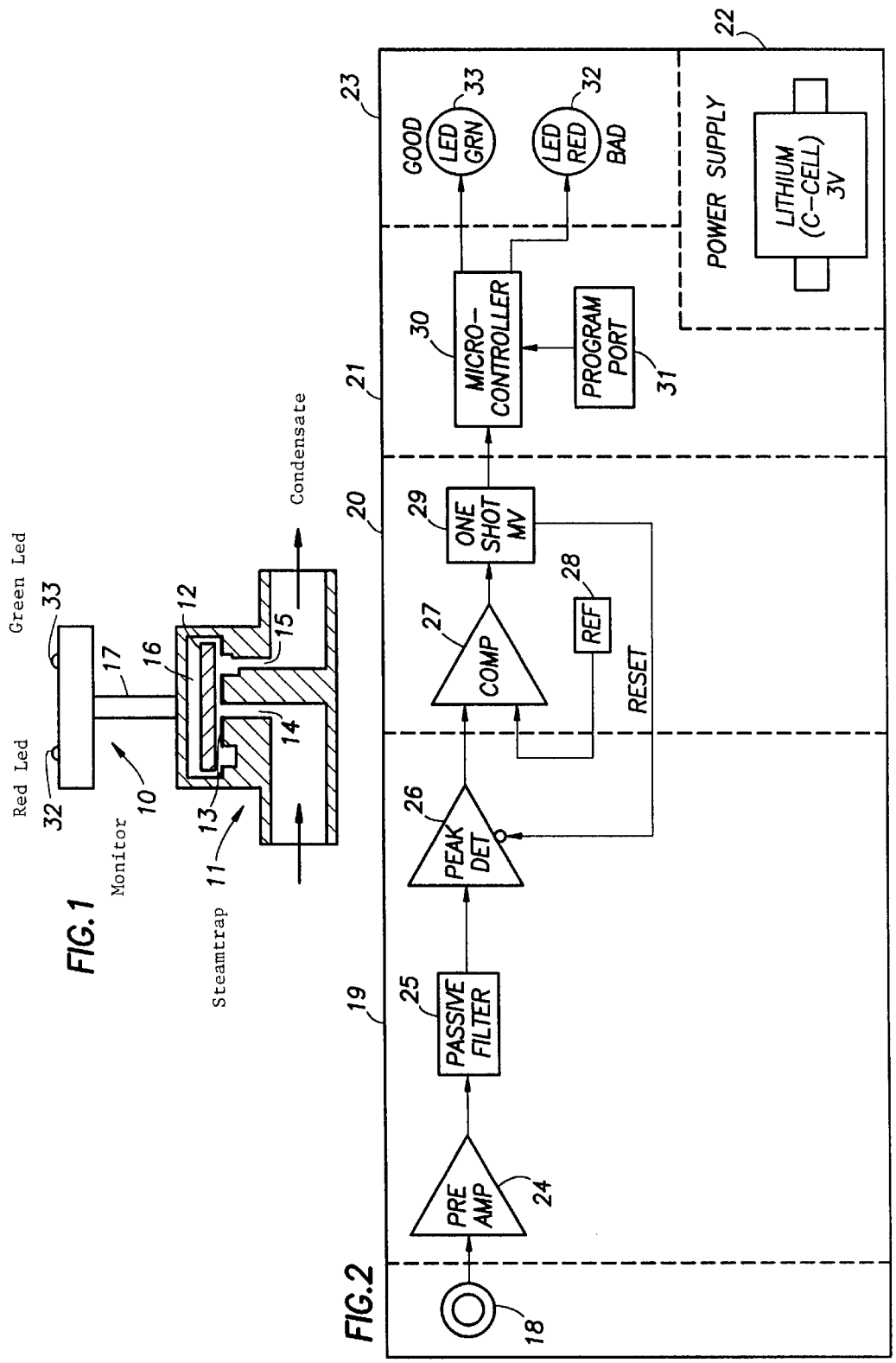

SELF-CONTAINED STEAM TRAP MONITOR

BACKGROUND OF THE INVENTION

1. Field of the Invention

The present invention relates to the field of monitoring the operations of devices used in fluid systems. More specifically, the present invention applies to the field of monitoring steam trap operation to detect and predict abnormal operation of the steam trap.

2. Description of the Prior Art

Typical steam-containing systems require that condensed fluids and some uncondensed gases be discharged from the steam to prevent system malfunction. To this end, a variety of devices have been employed to automatically discharge undesirable gases and condensate from steam-containing systems. These devices, referred to generally as steam traps, can operate in a variety of ways to perform the basic task of venting undesired gases and condensates from the steam system.

Failure of the steam trap in a steam system can produce serious system damage and loss. It is customary, therefore, to periodically monitor the operation of the various steam traps in the system to detect malfunctions of such devices and to identify abnormal operation that can indicate impending failure of the device.

In larger systems, the number of steam traps can be large, and the steam traps themselves may be difficult to access as well as to locate. Manual monitoring of steam traps can thus be difficult simply from the standpoint of locating a specific steam trap and then obtaining access to the steam trap once it has been located.

One manually operated prior art system used to evaluate steam trap operation, described in U.S. Pat. No. 4,898,022 to Yumoto et al., employs a monitor that must be handheld against the steam trap body to monitor vibration and temperature associated with the steam trap. The detected vibrations are compared with a standard baseline data set of vibrations representative of the type of valve being evaluated. Variations of the monitored characteristics from those in the standard baseline are indicative of abnormal operation of the monitored valve. The system is dependent, in part, upon the interpretive and manipulative skills of the operator, requiring the exercise of judgment as to the validity of the readings as well as requiring intimate and correct contact of the monitor with the valve being evaluated. The monitoring of this prior art system is not designed to be continuous for a particular steam trap and requires the physical presence of an operator at each steam trap during the monitoring.

In addition to the reliance on operator presence and skill, the Yumoto et al. technique suffers from the fact that the specific steam trap being monitored, even when operating properly, will not necessarily adhere to a "standard" operating pattern in a particular environment. Moreover, as the environment of a steam trap changes, the operation of the steam trap may also change. Use of a representative "standard" baseline data set for a particular type or model without proper regard to the steam trap operating environment and the operating history of the steam trap subjects the comparison of current operation data with such a "standard" baseline data set to mistaken analyses.

Other prior art systems have also employed evaluation techniques in which the mechanism being monitored is tested against a baseline data set to provide information about the mechanism's status or condition, or information about the system itself. Such systems are described, for example, in U.S. Pat. No. 5,154,080 to Hill et al., U.S. Pat. No. 5,535,136 to Standifer, and U.S. Pat. No. 5,206,818 to Speranza.

The Hill et al. system compares reflected ultrasonic signals and/or accelerometer signals against baseline data to evaluate check valve operation. Signals picked up by transducers placed externally on the valve are relayed by cables to a personal computer that processes the data to provide information about the valve.

The Hill et al. system employs baselines that are the results of tests and analyses previously performed on the valve assembly being evaluated. In this regard, the system is an improvement over the Yuunoto et al. technique, which uses representative baseline data. Inoperability or signs of wear of the valve using the Hill et al. system are determined by viewing computer results or viewing the data directly. An alarm is generated by the CPU when the values of certain monitored parameters exceed preselected levels. The Hill et al. system is not self-contained and does not provide an alarm or signal at the monitored component that identifies the location and condition of the component. The transducers and processing components required to implement the system are complex and expensive. As with the Yumoto et al. system, the Hill et al. system is not well-suited for continuous automated monitoring of valve operation.

The Standifer patent describes a technique in which an ultrasonic sound detector is used to accumulate data from known test leaks. The data is then compared with similar data from an actual system to quantify the leakage in the actual system. While the technique compares baseline data with on-line data for system evaluation purposes, individual control components in the system are not continuously monitored, and the condition or status of an individual control component is not automatically signalled by a self-contained monitor associated with the control component. The baseline data also is not used as an indication of normal operation, but is rather employed to provide a basis for quantifying the extent of leakage from the component or system.

The Speranza patent describes a system in which a portable monitor is taken to a "fugitive emission" source to identify the source and quantify the emission. The monitor, which may be a single unit that includes a computer, is taken to the component to be monitored to perform a specific test. Results of the test may be stored in the computer, compared with other tests from the same component, and displayed on a computer screen. The Speranza system does not provide continuous monitoring and does not provide automatically generated signals associated with a specific monitored component to show the location of the component and to signal the status or condition of the component.

U.S. Pat. No. 4,945,343 to Rodriguez describes a system for continuously detecting malfunctioning of a steam trap and signalling malfunction of the trap. The system employs thermocouples at the input and output of a steam trap to sense malfunctioning of the steam trap. An alarm light is activated when a malfunction is detected. While the Rodriguez system offers the advantage of continuous monitoring, it provides an indication of component failure rather than an indication of abnormal operation of the monitored component. The alarm of the Rodriguez system is only activated when given preset conditions are met. No baseline comparisons are made in the system to evaluate evolving changes in the steam trap operation over its lifetime in the system.

The concept of "standard" operation as a reference in continuously monitored systems is complicated by the fact that in the operation of a typical system, it is necessary to periodically shut down the system for either maintenance or repair or to modify the system design or operation. The sequence of shutting down and then restarting the system will produce a time-based operating change in the operation of the steam traps within the system. Such changes in system operation, when monitored by a system that employs only on-line operating conditions as the basis for establishing a standard baseline data set, may indicate abnormal operation of a steam trap that is in fact operating properly.

SUMMARY OF THE INVENTION

The system of the present invention employs a self-contained, continuously operating monitor to detect abnormal operation of a monitored component and to permit the taking of remedial action before adverse system operations occur. The monitor of the present invention is preferably adapted to be employed with a single control component in a specific operating environment. The operating characteristics of the monitored component, such as a steam trap, are compared with a specific baseline operating standard generated in the working environment, for the specific component being monitored and the condition or status of the monitored component is displayed at the component by an appropriate signal. In this regard, the monitor of the resent invention is physically associated with the monitored device to both directly display the device location and to signal the device's operating condition. This feature of the system permits "walk-by" surveillance of the component without the need for tracing alarm signals from a central monitoring point back to a specific component in the system and without the need for direct physical access to the component itself.

An important feature of the monitor and system of the present invention is that continuous monitoring of the monitored component is provided so that abnormalities are quickly detected as they develop. The system of the present invention also redefines "normal" operation of the monitored component during the life of the component. Changes in system operation and component environment, and even changes in component operating characteristics, are considered in the operating program to continuously refine the normal baseline operating data set. The result is a faster and more accurate identification of abnormal operation or actual or impending malfunction of the monitored component.

An important object of the present invention is to define "normal" operation for the monitored component to include start-up and shutdown sequences so that the system may be automatically reinitiated after a shutdown cycle without causing erroneous alert or malfunction alarms for the monitored component.

The monitor of the present invention is self-contained, can be easily moved from one monitored component to another, can be reprogrammed for use with a different component, is self-powered, and is independent of a connecting network with a central processing unit. The self-contained, on-site position of the monitor provides an immediate identification of the component being monitored with an immediate and continuous indication of the component's operating status. Low power requirements, an efficient program and reprogrammable microprocessing circuitry within the monitor provide long life, portability, and versatility to the monitor.

The automated, self-contained features of the monitor of the present invention are independent of operator skill, operator presence, or operator intervention. The lack of reliance on operator interpretation and presence increases the speed, accuracy, and efficiency of the monitoring system of the present invention. Continuous monitoring of the control device produces immediate recognition of abnormal operation so that timely action may be taken to correct or prevent undesired operating conditions.

A preferred form of the present invention employs a simple, sonic transducer to detect malfunction of a disk-type steam trap. Using audible sounds as the monitored operating characteristic permits the use of low cost, compact, readily available audio-to-electrical transducers as the detecting mechanism for the monitor. When employed to monitor operation of a disk-type steam trap, the monitor of the present invention can immediately detect opening and closing cycles of the steam trap by detecting and analyzing the sonic events associated with the disk valve operation. The disk closure rate and changes in the closure rate are monitored and compared with data in an evolving signature baseline for the same steam trap. The status and condition of the steam trap is thus constantly being evaluated against an evolving "standard." Normal operations of the steam trap, as well as variations from the norm, are continuously signaled by appropriately colored lights that are readily visible to system inspectors.

From the foregoing, it will be appreciated that a primary object of the present invention is to provide a self-contained, continuously operating steam trap monitor that analyzes low frequency audio sounds emitted by the steam trap to detect and evaluate the steam trap performance and to form a visual signal representative of such performance.

Another object of the present invention is to provide a system in which a normal, baseline set of data for a particular system device can be established by a monitor associated with such device and to compare on-line operations of such device against the baseline data set whereby variations between such on-line operations and baseline data set can be employed to determine the operating condition of the monitored component.

An important object of the present invention is to provide a self-contained monitor that can be physically secured to a steam trap to provide continuous monitoring and status reporting of the condition of the steam trap. It is also an object of the invention to provide a readily discernible indication of such condition, such as by the illumination of different colored lights included as a part of the monitor whereby the condition of the monitor can be readily apparent to an inspector without the need for coming into physical contact with the steam trap or tracing the location of the steam trap from information obtained from a central monitor.

It is a general object of the present invention to provide a self-contained monitor having an internal battery power supply, microprocessor, and signal conditioner as well as differently colored light signals to convey continuous information regarding the condition or status of a steam trap.

These objects, features, and advantages of the present invention, as well as others, will be more fully appreciated and understood by reference to the following specification, drawings, and claims.

BRIEF DESCRIPTION OF THE DRAWINGS

FIG. 1 is a partial vertical section illustrating the monitor of the present invention physically connected with a disk-type steam trap;

FIG. 2 is a schematic block diagram illustrating details in the electronic detection and processing portion of the monitor of the present invention.

DESCRIPTION OF A DETAILED EMBODIMENT OF THE INVENTION

Figure 3:
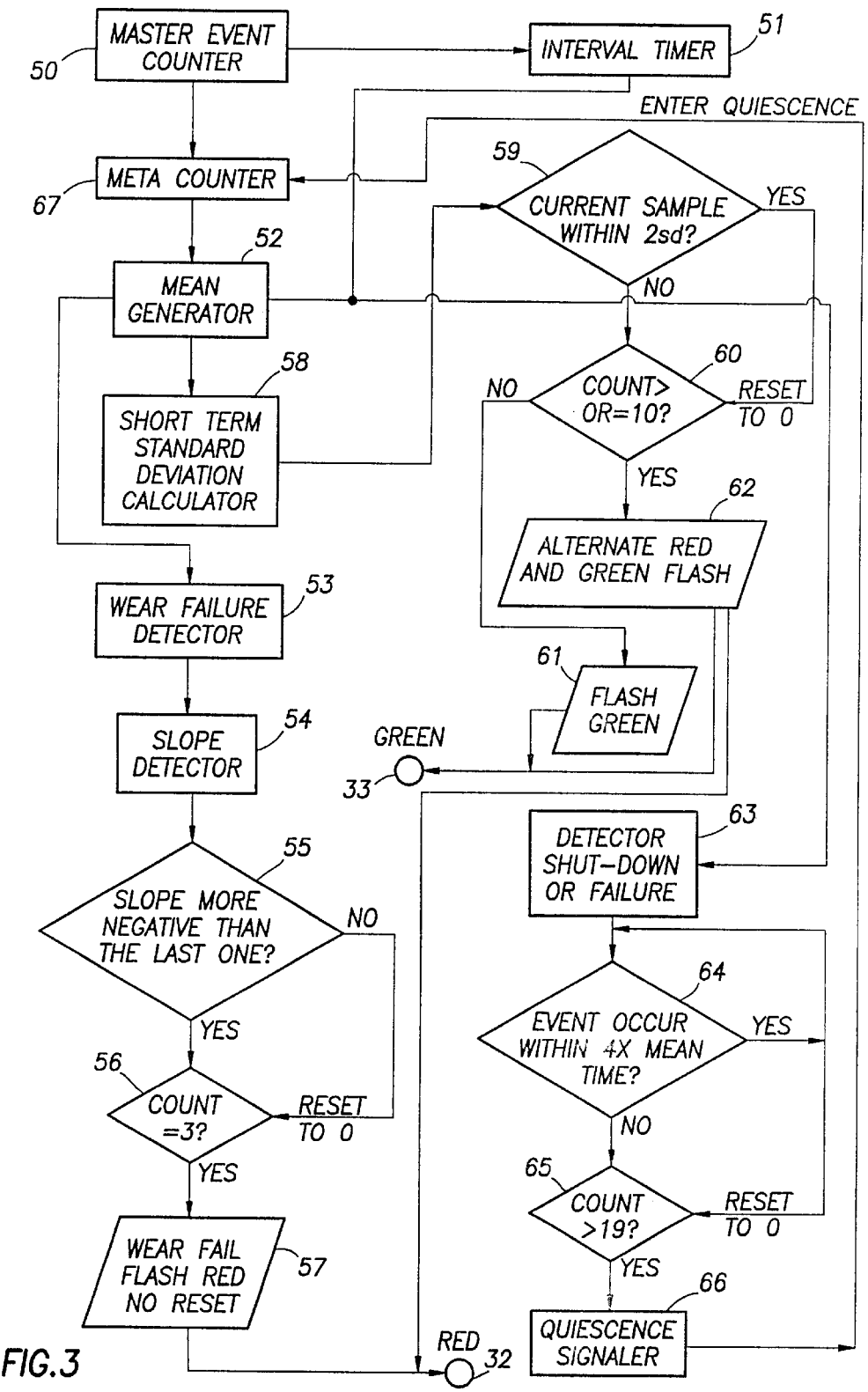
FIG. 3 is a decision diagram illustrating one example of a logic process employed in evaluating data from a steam trap to form a visible indication of the condition or status of such steam trap.

The self-contained monitor of the present invention is indicated generally at 10 in FIG. 1 mounted on the bonnet of a conventional disk-type steam trap indicated generally at 11. The disk trap 11 utilizes the heat energy in hot condensate within the system (not illustrated) in which the steam trap operates and the kinetic energy in steam to open and close a valve disk 12. The disk trap 11 is a phase detector, sensing the difference between liquid and gas or vapor.

During initial start-up, pressure created by cold condensate pushes the valve disk 12 off a seating surface 13, which uncovers an inlet port 14 and discharge outlet port 15, allowing discharge of the condensate from the system. As the condensate reaches the inlet port 14 (a restriction), it experiences a decrease in pressure and an increase in velocity. If the condensate is very close to steam temperature, the lower pressure will cause it to flash into steam. The resulting high velocity flow beneath the disk 12, with its attendant localized pressure reduction under the disk, causes it to snap shut. Flow through the trap then stops until the pressure in a chamber 16 over the disk decays sufficiently to allow the inlet pressure to force the disk off its seat 13. Condensate then flows through the trap until once again it reaches such a velocity and lowering of pressure that flashing occurs and the disk 12 can snap shut. This cycle continuously repeats itself—the disk opening to allow the flow of condensate and closing on high velocity flash steam. The opening and closing cycle may occur in as little as 5 milliseconds or less. Typical operation of a disk valve may require 10 or more cycles per minute. The disk-type steam traps have a tendency to fail gradually, predictably in the open condition. The device may, however, fail in the closed position. In either failure mode, however, the disk movement is appreciatively altered and will usually completely stop.

Abnormal operation of the disk-type steam trap is caused by wear of the disk 12 and seating surface 13, excessive back pressure downstream of the steam trap, and erosion and corrosion caused by particulate matter in the effluent flowing through the steam trap during on-line operations of the steam trap. A major indicator of abnormal operation of the disk-type steam trap is a change in the number of opening and closing cycles within a determined interval. Typically, a worn disk begins to open more frequently, which in turn accelerates the disk wear. Such changes in the number of opening and closing cycles within an interval may also be caused, for example, by changes in the system associated with the steam trap rather than abnormal operation of the steam trap itself.

In a preferred form of the invention, the monitor 10 detects, records, and analyzes the timing of the opening and closing cycles of the steam trap 11 based upon the occurrence of a sonic event representative of the opening and closing of the steam trap during the on-line operation of the trap within an associated steam system. As used herein, the term "on-line" is intended to identify operation of the monitored device within its associated system while performing or attempting to perform intended fluid control or processing functions within the system. The monitor 10 is self contained within a housing that is physically connected to the steam trap 11 by a thermally insulating, sound-conducting mount assembly 17. The mount assembly 17 and connected monitor housing employ a construction that guides the sound energy generated by the movement of the disk 12 up to the components contained within the housing of the monitor 10 while isolating the monitor from the heat of the steam trap. The sound frequencies associated with the steam trap operation are typically between 400 Hz and 2 kHz. The monitor housing and mount assembly 17 are selected to maintain temperatures within the monitor housing below levels that would damage the monitor components.

With reference jointly to FIGS. 1 and 2, the monitor 10 includes a transducer 18, a signal conditioning circuit 19, an analog event to discrete event converter circuit 20, a signal processor 21, a power supply 22, and a status indicator 23. The preferred form of the transducer 18 is a microphone device that converts sound in the audible frequency range to a representative electrical signal. The electrical signal is amplified by an operational amplifier circuit 24. The amplified signal is fed to a low pass filter 25 with a 3 db roll-off at 3 kHz. The amplified filtered signal is supplied to a conventional detector circuit 26 that functions as a continuous sample and hold device with a reset. The onset of a peak in the output of the filter 25 is detected, and a signal indicating the peak onset is held on the output of the peak detector 26, where it remains until the peak detector is reset. The signal from the peak detector is compared by a comparator 27 that functions conventionally to switch its output from a low level to a high level when the detected peak voltage level exceeds a value set by a reference level supply 28. This reference level value is selected to be as close as possible to the voltage levels seen at the onset of the peak voltage to increase the response of the system. In the present system, a voltage level of about 2 volts is employed. The change in level of the comparator 27 triggers a one-shot multivibrator 29. The output from the multivibrator 29 is a uniform pulse that is used to reset the peak detector 26 and inform a microcontroller 30 that a sonic event has occurred. The one-shot multivibrator also serves to eliminate signal bounce resulting from false signals that might otherwise occur during the time the steam trap is in an operating cycle.

The pulse from the one-shot multivibrator 29 is input as a discrete (high or low) signal to the microcontroller 30. The signal is processed and the result is translated to either a "normal" or "fail" discrete output. In a preferred embodiment, the active output is "blinked" on for 15 milliseconds and off for 5 seconds. The microcontroller has an embedded program memory that is an electrically erasable, programmable, read-only memory (EEPROM). After the circuit board of the monitor is assembled, the microcontroller is programmed via a program port connector 31.

In a preferred embodiment of the invention, the status detector 23 takes the form of a red light emitting diode (LED) 32 and a green LED 33. The LEDs 32 and 33 are preferably located at the top of the monitor 10, where they are readily visible during on-line operations. The green LED 33 is activated by the normal output from the signal processor, and the red LED 32 is activated by the fail output from the signal processor. A condition status between fail and normal is indicated by selectively flashing the red and green diodes.

Power for the self-contained monitor 10 is supplied by a long-life, 3-volt lithium "C" cell, such as a Sanyo Model CR23500SE-FTI, that can operate the system for five years or longer. The transducer 18 may be a Knowles Electret Microphone Model EA 1984-12S. The microcontroller 30 may be a Microchip PIC16LC84 that draws approximately 15 microamps. In a preferred form, the use of these components with the efficient process programmed into the microcontroller permits the monitor 10 to be assembled in a housing less than 2.5" long with a diameter of 1.375" and to have an operating life of five years or longer.

The microcontroller 30 is provided with a resident algorithm to monitor the changing operational characteristics of the steam trap over the steam trap lifetime. Initially, a baseline of normal operation is established by determining the normal operational baseline cycle signature of the steam trap during on-line operation. This is accomplished by sampling and recording over a period of time the sonic event that occurs as the steam trap opens and condensate and steam are ejected. This signature will vary from installation to installation with the cycle rate of the steam trap varying, for example, with the amount of condensate found in one system as compared to another.

The microcontroller is programmed to run a continuous test during on-line operation comparing the steam trap's operation to the baseline cycle signature. The results of each test are applied to decision making logic to determine the operational status of the steam trap. In general, if over a period of time, a significant change occurs in the steam trap operation as compared to the baseline cycle signature, then it can be determined that the steam trap is in a failure mode. If the test is within normal limits, a first color light flashes; if the test is out of normal limits, a second color light flashes; if other conditions are detected, the sequence and/or time length of the light patterns can be changed to indicate such conditions.

An example of the decision process employed in the resident algorithm of the present invention is illustrated in FIG. 3 in which a master event counter 50 receives the digital output from the multivibrator 29. The multivibrator 29 produces a digital pulse each time the steam trap opens and produces a corresponding sonic event. The master event counter accumulates a running count of the detected sonic events. The time between each successive sonic event is measured by an interval timer 51. The measured time is conveyed to a mean generator 52. The mean generator continuously adds the time between closures and divides each new sum by the total number of closures provided by the counter 50 to obtain a running mean for the time between closures. The mean determined after each new event is added is conveyed to a wear failure detector 53 that keeps a running store of means of 30,000 closures for each 30,000 closures. Thus, a mean of the first 30,000 samples, from 0 to 30,000 is determined; then a mean of the next 30,000 samples, from 30,001 to 60,000; then a mean is established from 60,001 to 90,000 samples, etc. Each incremental 30,000 sample mean value is conveyed to a slope detector 54 that determines the slope of the mean by subtracting the latest 30,000 sample mean from the preceding 30,000 sample mean. The slope value for each 30,000 mean is transmitted to a slope comparator 55 that determines if the slope of the mean is more negative than that of the just preceding mean. The slope of the 30,000 mean sample will become more negative as the time between closures for the 30,000 sample interval decreases. This increase in negative slope of the mean is associated with wear of the steam trap, which cycles more quickly as it begins to wear.

The slope comparator 55 sends a positive response to a negativity detector 56 if the slope of one 30,000 sample segment is more negative than that of the immediately preceding segment. The negativity counter 56 generates a positive signal that is sent to a wear alert 57 when three successive sample intervals show an increasingly negative slope. If less than three negative slopes occur in succession, the negativity detector 56 is reset to 0.

When the wear alert 57 receives a positive signal from the negativity detector 56, the red LED 32 on the monitor 10 is actuated to began flashing. The flashing red LED indicates to the visual inspector that the monitored disk-type steam trap is functioning abnormally. Typically, with this type of steam trap, the trap begins to cycle more rapidly as it begins to wear. A geometric relationship exists between the onset of wear and the eventual failure of the trap. This characteristic of the steam trap is employed in the algorithm of the present invention to more accurately detect the onset of component failure.

The information from the mean generator 52 is also conveyed to a standard deviation calculator 58 that is used to detect out-of-range (abnormal) conditions. The calculator 58 maintains a running average of approximately 300 samples (first in, first out), determining for each new sample the mean time between openings of the steam trap. A standard deviation comparator 59 determines whether the current sample supplied to the calculator 58 is within two standard deviations of the running mean determined by the calculator 58. If the current sample is not within two standard deviations, a deviation detector 60 determines whether the number of instances of deviations over two standard deviations totals less than 10. If, at any time, the deviation comparator 59 determines that a current sample is within two standard deviations, the deviation detector 60 is reset to zero. If the count is 10 or less, the detector 60 continues to supply a negative signal that actuates a normal indicator 61 to flash the green LED 33, indicating normal operation. Once the deviation detector 60 determines that the number of standard deviations equals 10 in a row, a positive signal is sent to a status change alert 62 that initiates an alternating flashing of the red and green LEDs 32 and 33, respectively.

An important part of the operation of the present invention is the system's ability to automatically recognize a shutdown/start-up situation and properly handle the data associated with the process within the database signature for the monitored component. A quiescence loop is illustrated in FIG. 3 as an example of one technique for handling the situation where the steam trap operation is shut down for an extended period of time without incorporating the misleading time-based data that could be accepted if the shutdown were not recognize as being a normal process. The information from the interval timer 51 and the mean from the mean generator 52 are communicated to a failure or shutdown detector 63. This information is conveyed to a long period event timer 64 that establishes whether a sonic event occurs within four times the mean time established by the mean generator 52. If an event does not occur within a period equal to four times the current mean time, for as many as 20 times, a long period detector 65 activates a quiescence signaler 68 that relays a signal back to the meta counter 67. The meta counter generates a signal that terminates the acceptance of additional time-dependant data within the system until a new sonic event is detected by the master event counter 50. During this period of quiescence, all means and status conditions of the various system components are maintained. The described technique ensures that time-dependent data and calculations are left undistorted by the extended time interval associated with a normal shutdown. Upon resumption of the system, sonic events will be reinitiated causing the meta counter 67 to renew system operation.

While the present invention has been described for use with a disk-type steam trap, it will be appreciated that the invention may be employed with any mechanical device employed to control fluids in a system. In its broader applications, the system and method of the present invention includes the capability of detecting the onset of mechanical failure or other abnormal operation or condition by comparing the characteristics of the system during a period of normal operation with those that occur over an extended operating period. The system and method of the invention adapt the signature baseline data set to correspond with the changing environment and operational characteristics of the monitored device itself. Shutdown procedures are recognized as part of the normal operation of a monitored component within a larger system. The calculating and recording techniques used within the process of the invention minimize computation time and storage capabilities to minimize power consumption. The low power consumption of the system is further enhanced by using LEDs and intermittently rather than continuously energizing the lights. In the specific application of the invention used to monitor a disk-type steam trap, a small, compact, low-cost, rapidly responsive, sonic detector is capable of being employed to adequately monitor the condition and operation of the steam trap.

Accordingly, it will be understood that the foregoing disclosure is merely illustrative and explanatory of the present invention and that various modifications and alternatives may be made without departing from the spirit and scope of the invention, which is more completely defined in the following claims.

What is claimed is:

1. A self-contained system for analyzing the on-line operation of a monitored mechanism, comprising:
    a detector for detecting a characteristic of said mechanism and forming a detection signal representative of said characteristic that varies with the operation of such mechanism;
    a processor for analyzing the detector signal formed by said detector;
    a baseline determiner included with said processor for analyzing said detector signal during a normal sequence of operations of said mechanism to establish a time-based baseline data set representative of said operating characteristic during said normal sequence;
    a sample comparator operatively connected with said processor for comparing a time-based on-line sample of said characteristic with said baseline data set and for generating a comparator signal when said sample and said baseline data set differ in a predetermined way;
    a response device responsive to said comparator signal to signify the existence of a difference in said data set and said sample; and
    a housing for assembling said system in a unitary assembly in operative communication with said mechanism.

2. The system as defined in claim 1 wherein:
    said mechanism comprises a steam trap;
    said detector comprises an audio-to-electrical transducer; and
    said variable operating characteristic comprises sound emitted by said steam trap.

3. The system as defined in claim 2 wherein sound detected from said mechanism is filtered to attenuate frequencies above a predetermined maximum frequency value.

4. The system as defined in claim 3 wherein said predetermined maximum frequency value is approximately 3 kHz.

5. The system as defined in claim 2 wherein said normal sequence includes a shutdown or start-up of said mechanism.

6. The system as defined in claim 2 wherein said sample comparator compares the time between on-line cycles of said mechanism and the time between corresponding cycles in said baseline data set of said mechanism.

7. The system as defined in claim 6 wherein said comparator signal is generated when the time between said on-line cycles becomes shorter than the time between said corresponding cycles in said baseline data set by a predetermined amount of time.

8. The system as defined in claim 1 wherein said normal sequence includes the initial start-up of said mechanism.

9. The system as defined in claim 1 wherein said sample comparator compares the time between on-line cycles of said mechanism and the time between corresponding cycles in said baseline data set of said mechanism.

10. The system as defined in claim 9 wherein said comparator signal is generated when the time between said on-line cycles becomes shorter than the time between said corresponding baseline data set cycles by a predetermined amount of time.

11. The system as defined in claim 1 wherein said detector, processor, baseline determiner, sample comparator, and response device are contained in a unitary assembly adapted to be mounted in energy communicating relationship with said mechanism.

12. The system as defined in claim 11 wherein:
    said mechanism comprises a steam trap;
    said detector comprises an audio-to-electrical transducer; and
    said variable operating characteristic comprises sound emitted by said steam trap.

13. The system as defined in claim 11 wherein:
    said detector comprises a microphone;
    said processor, baseline determiner, sample comparator, and response device comprise an analog signal conditioner supplied at its input with the electrical output of said microphone and operatively connected at its output to an analog-event-to-discrete-event converter that in turn connects through a programmed signal processor to a visible status indicator.

14. The system as defined in claim 1, further comprising a long-term processor for updating said baseline data set in response to changes in the operating environment of said mechanism.

15. A method of analyzing the on-line operation of a monitored mechanism comprising the steps of:
    monitoring said control mechanism, on-line, to detect a variable operating characteristic of said control mechanism;
    determining, on-line, a time-based baseline data set for said operating characteristic representative of a normal sequence of on-line operations of said control mechanism;
    comparing on-line operating characteristics of said control mechanism with operations represented by said baseline data set of operating characteristics;
    signaling when said operations represented by said baseline data set of operations and said on-line operations differ in a predetermined amount; and
    wherein the on-line operation of said mechanism includes repeated opening and closing operation of a valve device and the time between baseline valve operations is compared with the time between corresponding on-line valve operations.

16. A method of analyzing the on-line operation of a monitored mechanism comprising the steps of:

monitoring said control mechanism, on-line, to detect a variable operating characteristic of said control mechanism;

determining, on-line, a time-based baseline data set for said operating characteristic representative of a normal sequence of on-line operations of said control mechanism;

comparing on-line operating characteristics of said control mechanism with operations represented by said baseline data set of operating characteristics;

signaling when said operations represented by said baseline data set of operations and said on-line operations differ in a predetermined amount; and further comprising the step of modifying said time-based data set based on time-related changes occurring in the operating characteristics of said mechanism during the on-line operation of said mechanism.

17. A method of analyzing the on-line operation of a monitored mechanism comprising the steps of:

monitoring said control mechanism, on-line, to detect a variable operating characteristic of said control mechanism;

determining, on-line, a time-based baseline data set for said operating characteristic representative of a normal sequence of on-line operations of said control mechanism;

comparing on-line operating characteristics of said control mechanism with operations represented by said baseline data set of operating characteristics;

signaling when said operations represented by said baseline data set of operations and said on-line operations differ in a predetermined amount; and further comprising the step of modifying said time-based data set as a function of changes in the operating characteristics of said mechanism caused by changes in the environment of said mechanism.

18. A method of analyzing the on-line operation of a monitored mechanism comprising the steps of:

monitoring said control mechanism, on-line, to detect a variable operating characteristic of said control mechanism;

determining, on-line, a time-based baseline data set for said operating characteristic representative of a normal sequence of on-line operations of said control mechanism;

comparing on-line operating characteristics of said control mechanism with operations represented by said baseline data set of operating characteristics;

signaling when said operations represented by said baseline data set of operations and said on-line operations differ in a predetermined amount; and further including the step of identifying and processing data generated between shutdown and start-up of a system associated with the device to prevent corruption of the time-based baseline data set generated during on-line operations of said device.

* * * * *